United States Patent [19]

Deyring

[11] Patent Number: 5,075,804
[45] Date of Patent: Dec. 24, 1991

[54] MANAGEMENT OF DEFECT AREAS IN RECORDING MEDIA

[75] Inventor: Klaus-Peter Deyring, Scotts Valley, Calif.

[73] Assignee: Alps Electric Co., Ltd., Tokyo, Japan

[21] Appl. No.: 333,066

[22] Filed: Mar. 31, 1989

[51] Int. Cl.[5] ............................................... G11B 5/09
[52] U.S. Cl. ........................................ 360/49; 360/53; 360/54; 369/32; 369/48; 369/54
[58] Field of Search ..................... 360/31, 49, 53, 54, 360/77.08; 364/200, 900; 369/54, 58, 43, 48, 49, 32, 59, 111

[56] References Cited

U.S. PATENT DOCUMENTS

| 4,498,146 | 2/1985 | Martinez . | |
|---|---|---|---|
| 4,669,004 | 5/1987 | Moon . | |
| 4,746,998 | 5/1988 | Robinson | 360/49 X |
| 4,774,700 | 7/1988 | Satoh et al. | 369/54 X |
| 4,821,251 | 4/1989 | Hosoya | 369/54 X |
| 4,839,879 | 6/1989 | Sawada | 369/54 X |
| 4,935,825 | 6/1990 | Worrell | 360/54 X |

FOREIGN PATENT DOCUMENTS

| 0127311 | 5/1984 | European Pat. Off. | 360/49 |
|---|---|---|---|
| 0143705 | 6/1982 | Japan | 360/49 |

Primary Examiner—Roy N. Envall, Jr.
Assistant Examiner—Hung H. Bui
Attorney, Agent, or Firm—Guy W. Shoup; Norman R. Klivans

[57] ABSTRACT

An improved method of managing media defects in disk drives keeps an operating list of the tracks in the disk drive, and for each track enters on the list the number of good sectors (i.e., those free of defects) in that track. Thus the information on the operating list is sufficient for the disk drive microprocessor to avoid use of the defective sectors, each of which is labelled in its header as being defective. This method is compatible with SCSI and other common disk drive interfaces.

20 Claims, 8 Drawing Sheets

|  | DEFECTIVE SECTOR | | | GOOD SECTOR | | |
|---|---|---|---|---|---|---|
| LBA | CYLINDER | HEAD | SECTOR | CYLINDER | HEAD | SECTOR |
| 9 | 1 | 0 | 5 | 1 | 5 | 2 |
| 12 | 1 | 0 | 8 | 1 | 5 | 3 |
| 18 | 1 | 0 | 15 | 1 | 5 | 4 |
| ⋮ | ⋮ | ⋮ | ⋮ | ⋮ | ⋮ | ⋮ |
| 70103 | 50 | 1 | 3 | 30 | 5 | 20 |
| 70150 | 50 | 1 | 51 | 30 | 5 | 21 |
| 70165 | 50 | 1 | 66 | 30 | 5 | 22 |
| ⋮ | ⋮ | ⋮ | ⋮ | ⋮ | ⋮ | ⋮ |

FIG. 2C
(PRIOR ART)

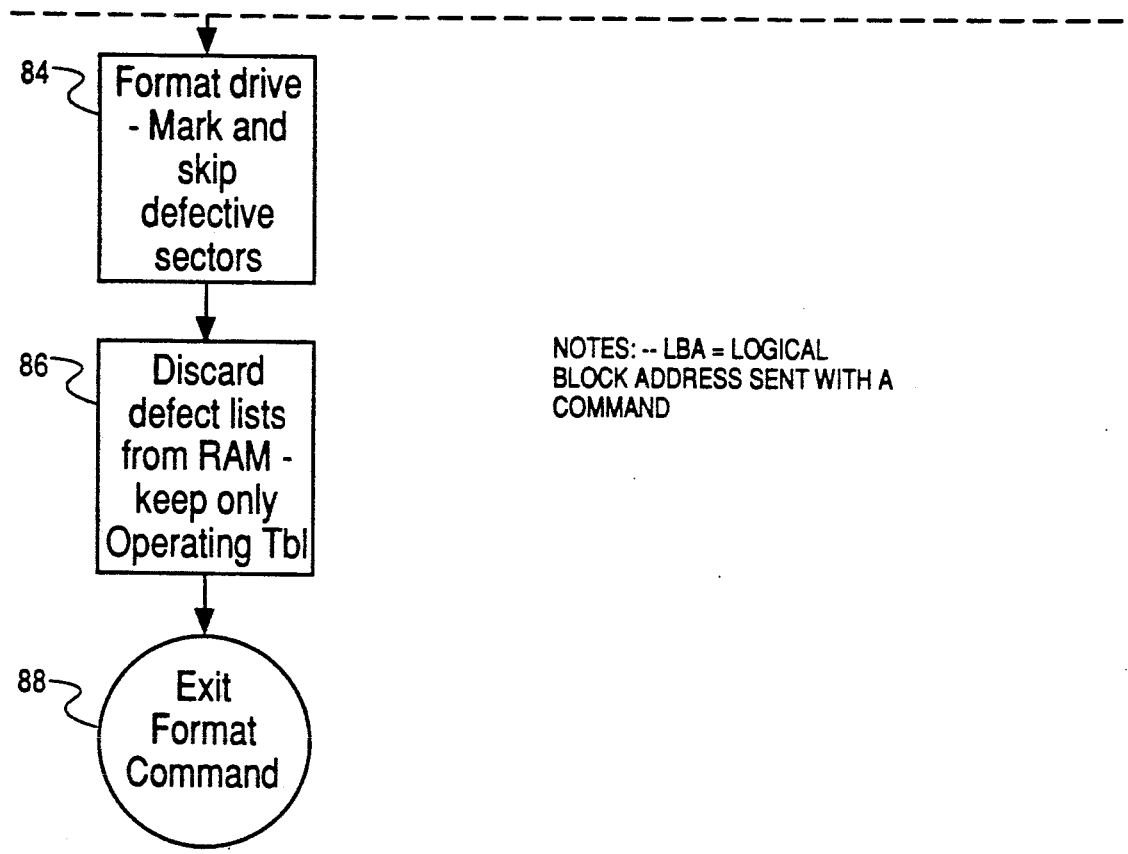
Fig. 3A"

MANAGEMENT OF DEFECT AREAS IN RECORDING MEDIA

BACKGROUND OF THE INVENTION

1. Field of the Invention

This invention relates to information storage systems, and in particular to a method for the management of storage media defects in disk drives.

2. Description of the Prior Art

Media are commonly used for storage of information in data processing. Examples of such media are magnetic disks and tapes. An increase in the media storage capacity per unit of area tends to increase the occurrence of defects in the media. Defects are flaws in the media that make portions of the media unusable, and are the result of imperfections in the media manufacturing process.

As the storage capability of bulk storage media is increased, it is more difficult to manufacture defect-free storage media devices, and it becomes costly to scrap flawed media. Thus a method is needed to permit the use of storage media having flawed sections.

In U.S. Pat. No. 4,498,146, issued Feb. 5, 1985, Martinez discloses a typical prior art method for avoiding accessing defective locations in storage media. A table of addresses of defective locations is first constructed. When an address is obtained for accessing a location in the storage medium, the contents of the address table are read to determine if access to the media will be impacted by defective locations, and the address is modified to avoid usage of defective locations. The storage location designated by the modified address is then accessed. If none of the defective locations impact the access, the storage location designated by the obtained address is accessed. The above process is carried out during execution of the operation for whose execution the address was obtained. The essence of the prior art therefore is keeping a complete list having a separate entry for each of the defective (i.e., "bad") storage locations on the media of a disk drive.

The address table comprises an ordered list of the addresses of defective locations. The obtained address is a logical address, while the modified address is a physical address. Contents of the table are read to determine the number of defective locations that affect the access, and the logical address is translated into the physical address by using the determined number of defective locations in the translation.

A typical prior art disk drive 10 is shown in FIG. 1. Disk drive 10 includes disks 53 which are the magnetic storage media. A drive motor 51 spins the disks 53 past read and write heads 57 which access selected portions of the disks 53 for data storage and retrieval. Motion of the heads 57 and selection of one or more particular heads are performed by head positioning and selecting circuitry 52, which operates under control of disk microprocessor 12.

As shown in FIG. 1, there are a plurality of disks 53. Each disk 53 has one head 57 associated therewith. The surface of each disk 53 is divided into a plurality of circular concentric tracks 54. In this case, only one surface (i.e., side) of each disk 53 is in use. It is well known to use both surfaces of each disk 53 for recording, by providing a head for each surface. Tracks 54 on all of the disks 53 which lie the same radial distance away from the centers of the disks 53 logically form a cylindrical surface referred to as a cylinder 55. Thus each track 54 of each disk 53 lies in a unique cylinder 55. Each track 54 is furthermore logically subdivided into a plurality of segments or areas, typically referred to as sectors or blocks 56. Disk drive 10 including microprocessor 12 and RAM (Random Access Memory) associated with microprocessor 12 is connected to host computer 15 by means of disk controller 17.

The cylinders 55, tracks 54, and sectors 56 are used to define graduations in the size of storage locations of the disk drive 10. Hence, addressing within the disk drive 10 is accomplished by specifying a head 57, to select one of the disks 53, a cylinder 55, to select a particular track 54 on each disk 53, and a sector 56 to select a data block.

Prior to providing the disk drive 10 to the user, the manufacturer of the disk drive 10 tests it for defects. The manufacturer's specifications for the particular disk drive type include the maximum number of defects that the disk drive 10 is allowed to have. If the specified maximum number of defects is not exceeded, the disk drive 10 is considered to be usable. The manufacturer supplies with the disk drive 10 information about the disk drive 10 which includes the sites of the defects in the disk drive 10. The manufacturer typically stores this information in a defect table (further described below) which is located on a particular reserved track 54 (see FIG. 1) of one of the disks 53.

Each sector 56 includes conventionally a header area (not shown) at the beginning of the sector 56. The header area includes a place for the sector address. As part of the formatting of the disk drive 10 (either at the factory or by the user), a sector address is written in each sector header area. Bad (i.e., flawed) sectors are typically identified and the defect list is constructed accordingly by specialized testing equipment by the disk drive manufacturer. Some disk drive interface standards (such as SCSI) also include means to detect and list defective sectors when the disk drive is in operation by the user.

FIG. 2A shows a typical track "n" with physical sector numbers (i.e., physical addresses) N, N+1, N+2, ... N+7; physical sector number N corresponds to logical block number (i.e., logical address) N*. Physical sector number N+1 is a bad sector, and so does not correspond to any logical block number. Physical sector number N+2 corresponds to logical block number N*+1, etc, and physical sector number N+4 is also a bad sector and so does not correspond to any logical block number.

The above description applies to various kinds of storage devices including magnetic recording disk drives (both floppy and hard disk drives) and optical recording disk drives.

Thus in the prior art, a disk drive uses manufacturer-provided information about the location of defects to construct a sequentially ordered defects list of addresses of defective storage locations in the disk drive, and the list is stored in a table on the disk media.

FIG. 2B shows in schematic form such a prior art disk drive sector having the above described defect management scheme. The disk surfaces are labelled as surface 0, surface 1, ... surface 5. In this example, each surface has 822 physical sectors, numbered consecutively on surface 0 through surface 5. As shown, in this prior art defect management scheme, a bad sector (labeled "BAD") on surface 2 is effectively "replaced" by a good sector selected from one of the good "SPARE SECTORS" on surface 5 by using the replacement list of bad sectors and substitute spare sectors. Thus the good spare sector on surface 5 is assigned the logical block number (i.e., logical block address) that would have been assigned to the bad sector on surface 2 if the bad sector had not been defective.

A prior art defects list corresponding to the structure of FIG. 2B is shown in FIG. 2C. The first column is the logical block address (LBA) number; the cylinder number, head number, and sector number of the bad sector that would have had that LBA number if the sector had not been defective are the next three columns. Then the last three columns show the cylinder number, head number, and sector number of the spare sector assigned to replace the bad sector.

Also known in the art is the "sector slipping" technique for provision of spare sectors. In this case, instead of using spare sectors provided on a separate disk surface, the bad sector is skipped over and the logical block address that would have been associated with the bad sector had it been good is "slipped" to the next good sector on the same track. This method is used in conjunction with a defects list similar to that shown in FIG. 2C.

Such prior art methods have the disadvantage that if a particular disk drive has a significant number of defects, the defects list is very lengthy. This slows down operation of the disk drive whenever the defects list is accessed due to the need to go through the entire list. In addition, in many disk drive controllers (such as the well known SCSI "Small Computer System Interface" controllers) the controller actually keeps track of a logical address of storage locations, rather than a physical address. In this case, the use of a lengthy defects list slows down the calculation of the physical addresses from the logical addresses, since the defects list must be referred to whenever a physical address is calculated.

SUMMARY OF THE INVENTION

In accordance with the present invention, a disk drive microprocessor (or computer) maintains in its memory an operating table which lists the physical address of each track on the disks that has any defective sectors. The operating table lists for each such track the number of good sectors on that track. The operating table also identifies each track by cylinder number and head number, and by the logical address of the first good sector on that track.

The operating table is preferably constructed each time the disk drive is formatted, by scanning the prior art defects list or lists conventionally present on one of the disks. During formatting a "correct" address is written in the header area of each good sector. A "correct" address is an address within a predetermined range of correct addresses. Thus an allowable range of sector numbers is defined for addressing good sectors on each track. The bad (defective) sectors have an out-of-range address written into their header areas during formatting. Thus the bad sectors are designated at formatting as not being available for further use (i.e., for writing data on). When a bad sector is encountered during accessing of data, the next good sector is accessed instead, as described above in the prior art "sector slipping" method.

Then, each time the disk drive receives a read, write, seek, or translate command referencing a desired sector by its logical address from the host computer, the disk drive microprocessor searches the operating list for the arithmetically nearest logical address to the desired sector. The microprocessor then calculates, using data in the operating table, the physical address of the sector corresponding to the desired logical sector. Then the read, write, or other operation is performed conventionally using the physical address so calculated.

The present invention has the advantage over the prior art of substantially reducing the amount of defects data kept in the typically volatile memory associated with the microprocessor in order to calculate physical addresses, because the operating table is much shorter than the prior art defects list. This makes such calculations, and hence the operation of the disk drive, faster than in the prior art by reducing the time needed to search the defects data.

The present invention is compatible with SCSI and other well known disk drive interfaces. The present invention is applicable to hard disk drives, floppy disk drives, optical disk drives, and other storage media devices.

BRIEF DESCRIPTION OF THE DRAWINGS

FIG. 2C shows a prior art defects list.

DETAILED DESCRIPTION OF THE INVENTION

Figure 1:
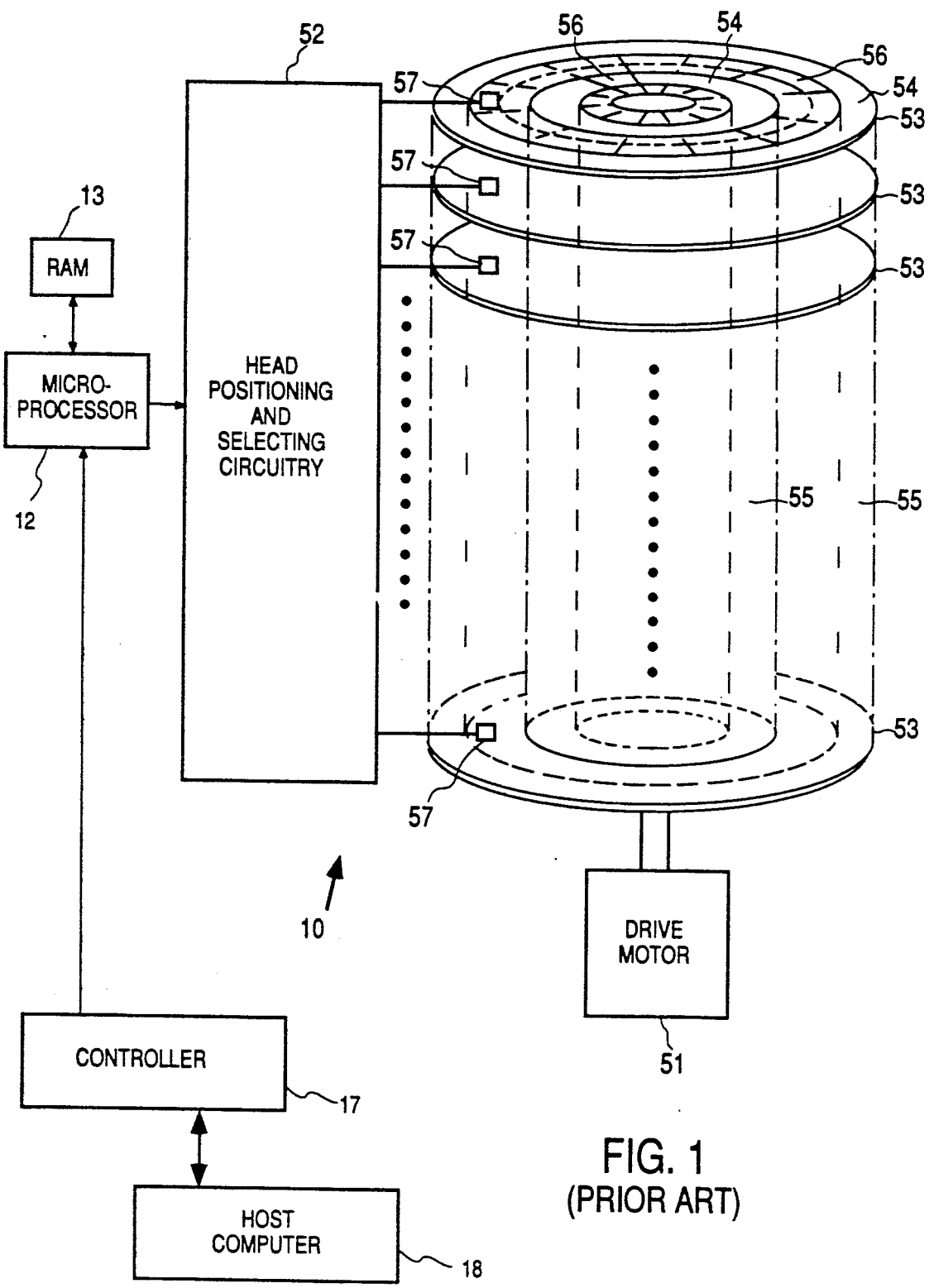
FIG. 1 shows a prior art disk drive.
Figure 2A:
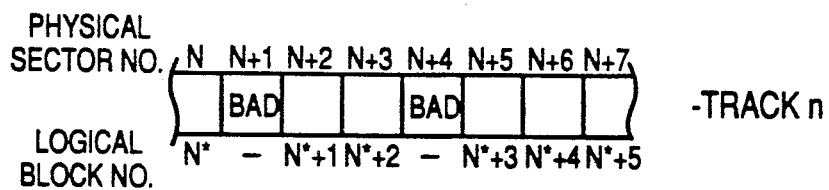
FIG. 2A shows a prior art disk format.
Figure 2B:
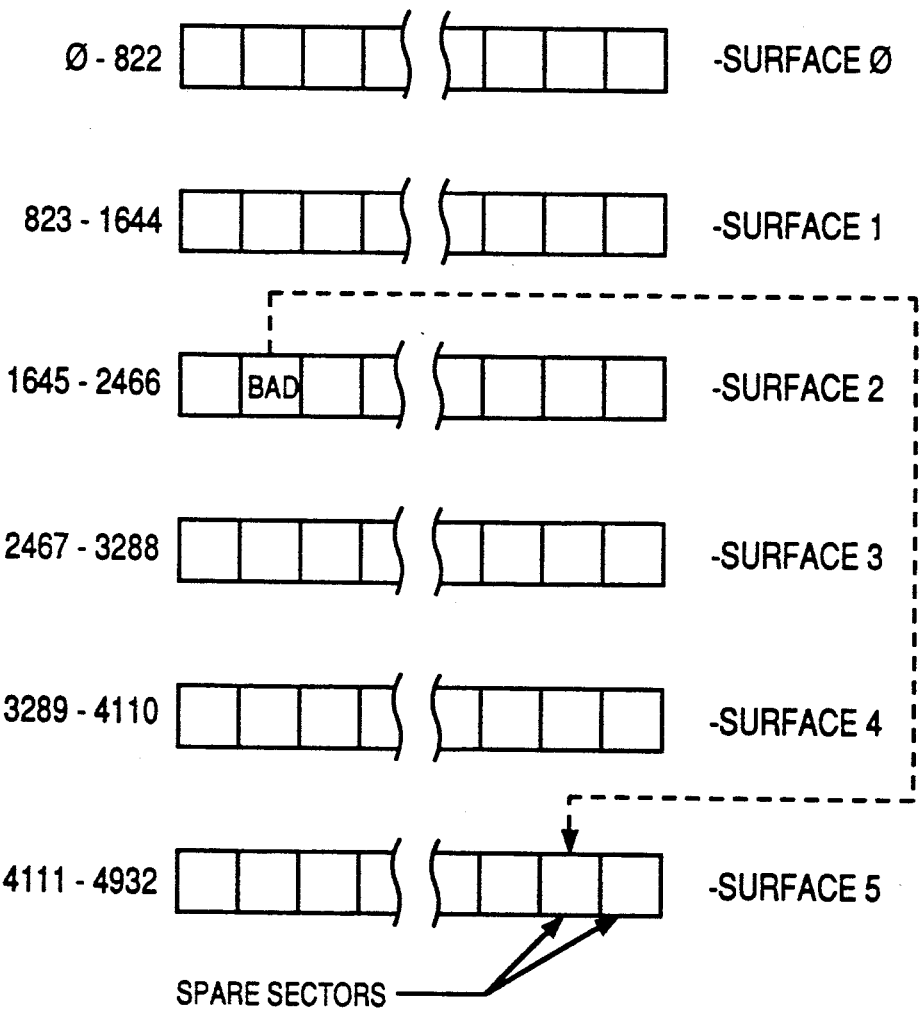
FIG. 2B shows a prior art disk format.
Figure 3A:
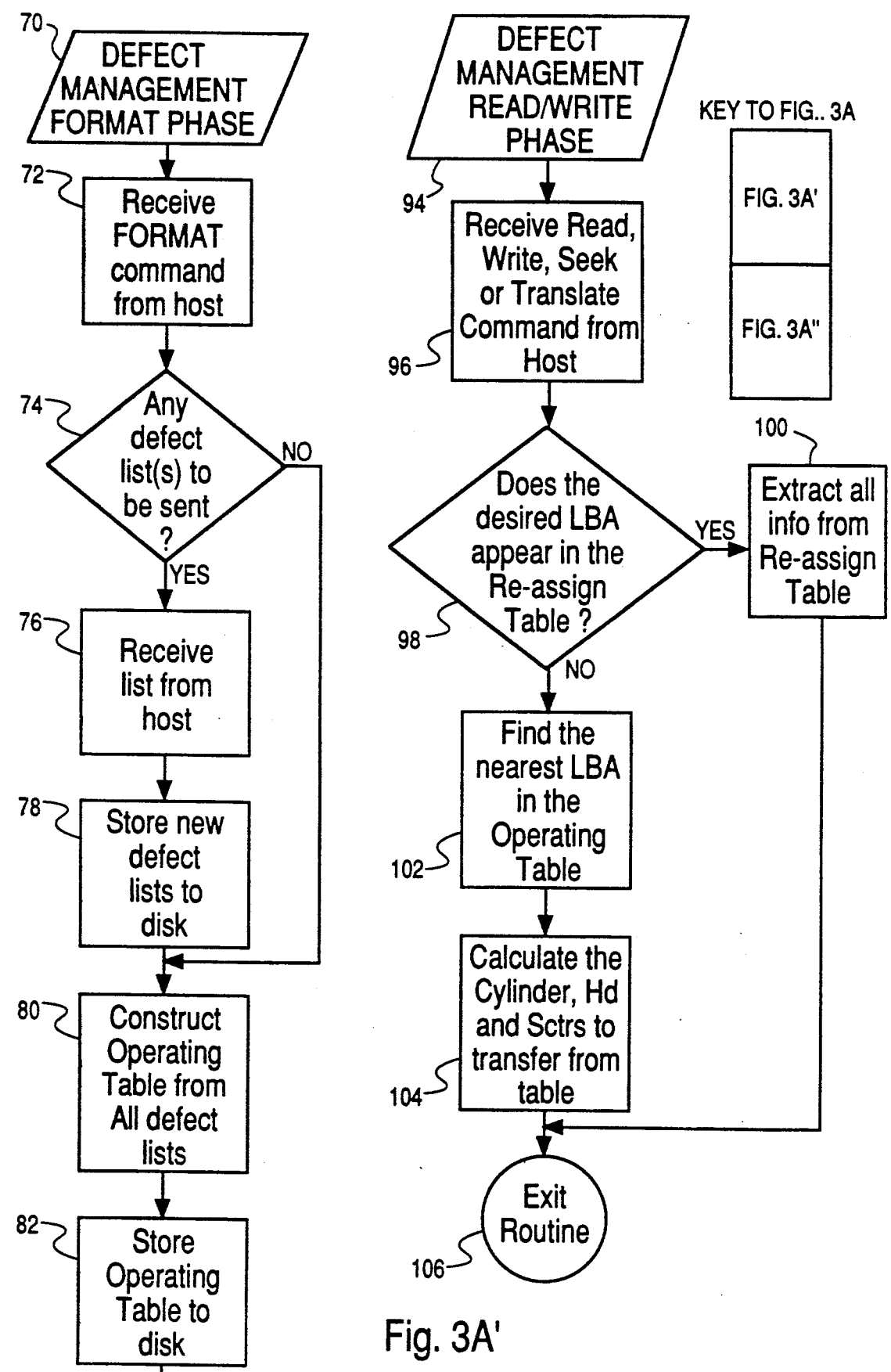
FIGS. 3A, 3B and 3C show flow charts representing one embodiment of the invention.
Tables 4A to 4M show a computer program corresponding to the embodiment of the invention shown in FIGS. 3A, 3B and 3C.

The preferred embodiment of the present invention is shown in flow chart format in FIG. 3A. The preferred embodiment of the present invention is applicable to a disk drive 10 as shown in FIG. 1. The method of the present invention is preferably under control of microprocessor 12 which is conventionally installed in disk drive 10. The preferred embodiment includes two aspects. The first aspect is shown on the left side of FIG. 3A, and this is the procedure used to format the recording medium (i.e., the disks) in accordance with the invention. A recording medium is typically only formatted once, either by the manufacturer or when first used by the ultimate user. However, reformatting at other times is usually possible. The second aspect is shown on the right side of FIG. 3A, and shows the procedure in accordance with the present invention each time the disk drive translates a logical to physical address or vice-versa.

The defect management procedure in accordance with the present invention in its first aspect relating to the recording medium format phase 70 starts with the disk drive microprocessor receiving a format command from the host computer at receiving command step 72. Then the microprocessor ascertains at defect list step 74 if there is any new defect list; i.e., if the host computer or controller has any list of defects on the recording medium in addition to the preexisting manufacturer provided defect list stored on one of the disks. If there are no new defects, the procedure jumps to operating table step 80. If there are new defects, the disk microprocessor receives the list at receive lists step 76 and stores it on a disk at a reserved location at store lists step 78.

Then the next step at construct table step 80 is to construct the operating table including information on the defects from all defect lists stored on the disk.

The preferred embodiment of the invention (see FIG. 3B which shows an exploded view of construct table step 80 from FIG. 3A) uses a SCSI interface. In this embodiment these various defect lists include the Primary list 120 of defects (i.e., the conventional "P" list) provided by the disk drive manufacturer and also the later provided Grown list 124 (i.e., the conventional "G" list) which lists defects found typically by the computer systems manufacturer who installs the disk drive in his product.

As explained above, the operating table 128 lists the logical block address (i.e., LBA) of the first sector for each track having a defective sector, and also lists the cylinder and head numbers for that track (i.e., the track number); and also for that track lists the number of good (i.e., nondefective) sectors. The operating table is then written to the disk at store operating table step 82 (see FIG. 3A). The next step at format drive step 84 is to format (or reformat) the disk surfaces, including the step of marking the defective sectors which are listed in the defects lists so that these sectors will be recognized as being "bad". The marking preferably involves providing each defective sector with an out-of-limits address in its header as described above. Then at discard lists step 86, the defects lists are discarded (i.e., removed) from the RAM 13 (Random Access Memory) conventionally associated with the microprocessor 12 of FIG. 1; the operating table is kept in RAM 13. Then the format procedure is exited at exit step 88 in FIG. 3A.

The operating table 128 (see FIG. 3B), which is typically kept in nonvolatile memory (i.e., on the disk) and copied to the RAM of the microprocessor whenever the disk drive is powered up, has the following format in its preferred embodiment:

| | Operating Table (Example) | | |
|---|---|---|---|
| LBA # (4 bytes) | Cylinder # (2 bytes) | Head # (1 byte) | # Good Sectors (1 byte) |
| 1 | 1 | 0 | 70 |
| 71 | 2 | 0 | 69 |
| 359 | 6 | 0 | 71 |
| . | . | . | . |
| . | . | . | . |
| . | . | . | . |
| 270,000 | 938 | 3 | 50 |

The data in the operating table is conventionally kept in binary form (not shown). The field for the LBA number for each row (i.e., entry) is preferably 4 bytes wide. The LBA number for each entry is the number of the first LBA of each track (i.e., a particular cylinder and head) listed in the table. Thus LBA 1 in the example is the number of the sequentially first LBA on the track which is the track at cylinder 1, head zero. The cylinder numbers are conventionally numbered radially from the outermost to the innermost track; in the example shown, the innermost track having a defective sector is cylinder 938, head 3. The field for the cylinder number is preferably 2 bytes wide. The heads are conventionally numbered 0, 1, 2, 3, in the example, which is for a drive having only four disk surfaces. The field for the head number is preferably 1 byte wide. For each row of the table, the last item is the number of good (nondefective and hence usable) sectors in that track. The field for the number of good sectors is preferably 1 byte wide. In the example, there is a total (good plus bad) of 72 sectors per track, so the listed entries in the example have 50 to 71 good sectors. As noted above, those tracks with all good sectors (i.e., 72 in the example) are preferably not listed in the version of the operating table kept in RAM 13 of microprocessor 12.

Thus for a typical 40 megabyte capacity drive having 200 defective sectors, occurring in sixty different tracks, the operating table would require 8 bytes/entry×60 entries=480 bytes of storage.

The defect management procedure for reading, writing, seeking, or translating in accordance with the invention is shown starting at read/write phase step 94 in FIG. 3A. First, the microprocessor receives a read, write, seek (i.e., move the recording heads from one track to another) or translate (i.e., convert logical to physical address or vice versa) command from the host computer or controller at receive command step 96. Then, the microprocessor determines at reassign table step 98 if the Logical Block Address (LBA) sent with the command (i.e., the desired LBA) appears in the reassign table.

The conventional reassign table ("R" table) is a defects list sent from the host computer, and shows the reassigned physical address for each logical address that has been reassigned due to a defect found in a sector since the last time the disk drive was formatted. The LBA is the logical address on the disk drive of the particular sector referred to in the command. If the desired LBA does appear in the reassign table, then the microprocessor finds the physical address corresponding to that LBA in the reassign table at information extraction step 100. Normally, the reassign table is empty, i.e., no LBA's appear in it because no new defects have been found on any of the disks since the last formatting of the disk drive.

If the desired LBA does not appear in the reassign table (as is normally the case) the operating table is accessed at find LBA step 102. Then the arithmetically nearest LBA in the operating table to the desired LBA is located by means of a binary search in the operating table.

The operating table, as described above, is constructed during formatting of the disk drive by scanning each defects list (of which there may be several) and counting the number of defects in each track. That number of defects is subtracted from the number of sectors per track (72 in the example) to arrive at the number of good sectors per track.

As shown in FIG. 3A, the microprocessor in the disk drive finds the nearest LBA in the operating table to the desired LBA at find LBA step 102. The search for the nearest LBA preferably first determines if the desired LBA appears in the operating table; if so, that LBA is used for the calculations in the next calculate step 104.

If the desired LBA does not appear in the operating table, then a conventional binary search of the operating table is performed to determine which two LBA entries in the operating table bracket the desired LBA. The operating table entry of interest is then the one which forms the lower boundary of the bracket, i.e., the operating table entry LBA closest to but having a value numerically less than the desired LBA.

In calculate step 104, the operating table entry LBA so found, and its corresponding cylinder number, head number, and number of good sectors, are used to calculate the cylinder number, head number, and sector number (i.e., physical address) which correspond to the desired LBA. This calculation is performed as follows:
1. Calculate a delta LBA value, which is equal to the number of the desired LBA less the value of the closest LBA found by the search of the operating table, plus the number of good sectors in the operating table entry.
2. Calculate a cylinder value, which is equal to the delta LBA value divided by the number of sectors per cylinder plus the number of the cylinder for the LBA found in the operating table search. The number of sectors per cylinder is the nominal number of sectors in a defect free cylinder for the particular disk drive. The remainder from the division of the delta LBA value by the number of sectors per cylinder is not used in this step.
3. Calculate a head value, which is equal to the remainder from step (2) divided by the nominal number of sectors per track, plus the number of the head for the LBA found in the operating table search, again ignoring any remainder from the division for this step.
4. Calculate a sector value, which is equal to the nominal number of sectors per track (i.e., 72 in the example above) less the remainder from step (3).

The resulting cylinder value, head value, and sector value are the physical address corresponding to the desired LBA. This process as described above of converting a logical address to a physical address, as shown in find LBA step 102 and in calculate step 104 of FIG. 3A, is shown in greater detail in flow chart form in FIG. 3C.

Thus the physical address corresponding to the desired LBA is determined at calculate step 104 in FIG. 3A, and the routine exited at exit step 106. Then the conventional read or write operations are performed.

The above defect management procedure during read/write including read/write phase step 94 to exit step 106 is preferably undertaken at the same time as a conventional seek (i.e., change of cylinder by the recording heads). Since the seek is necessary to operation of the disk drive, the defect management procedure in effect takes up no elapsed time by being done in parallel with the seek, and so does not slow down disk drive operation.

Figure 3B:
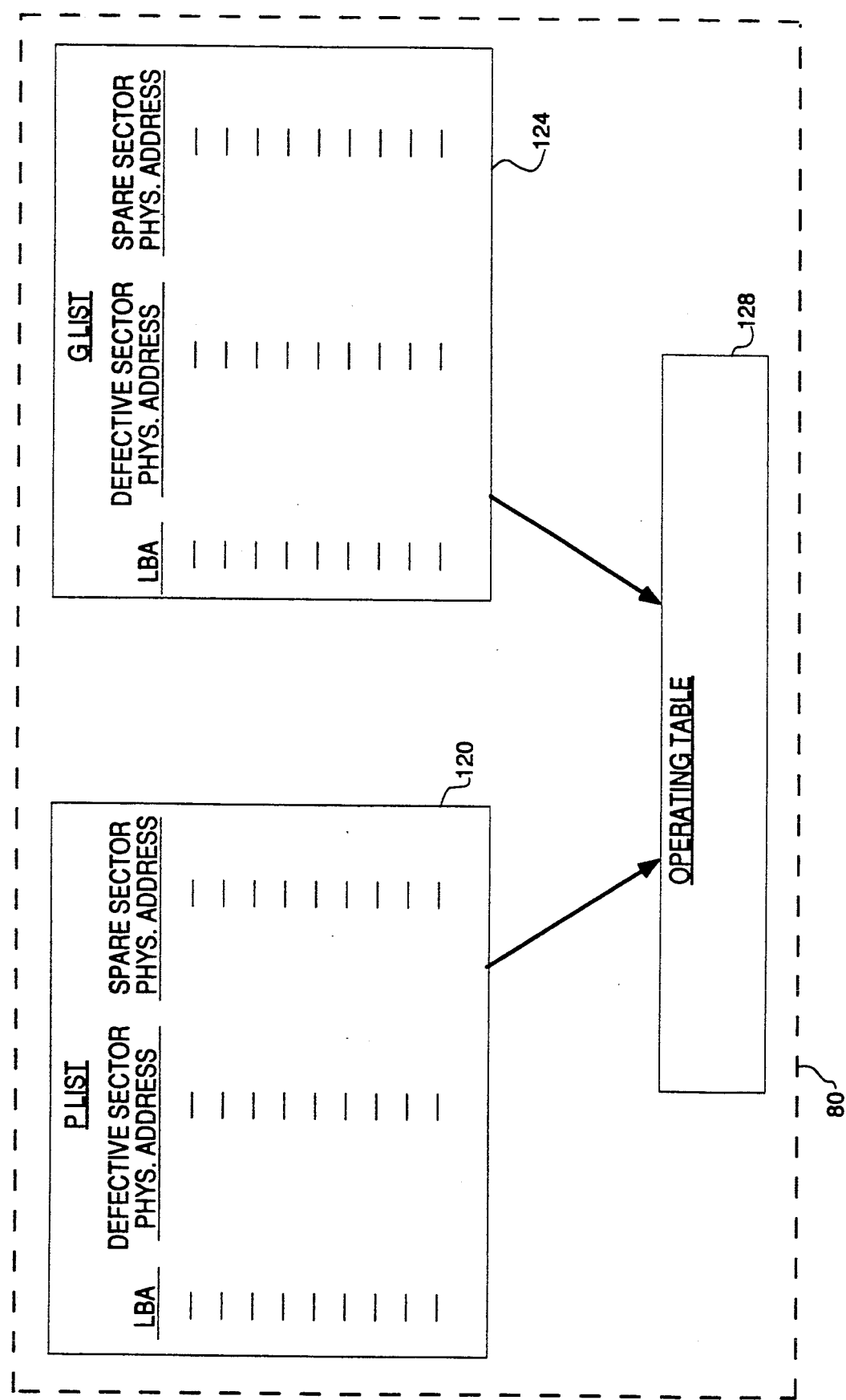
Figure 3C:
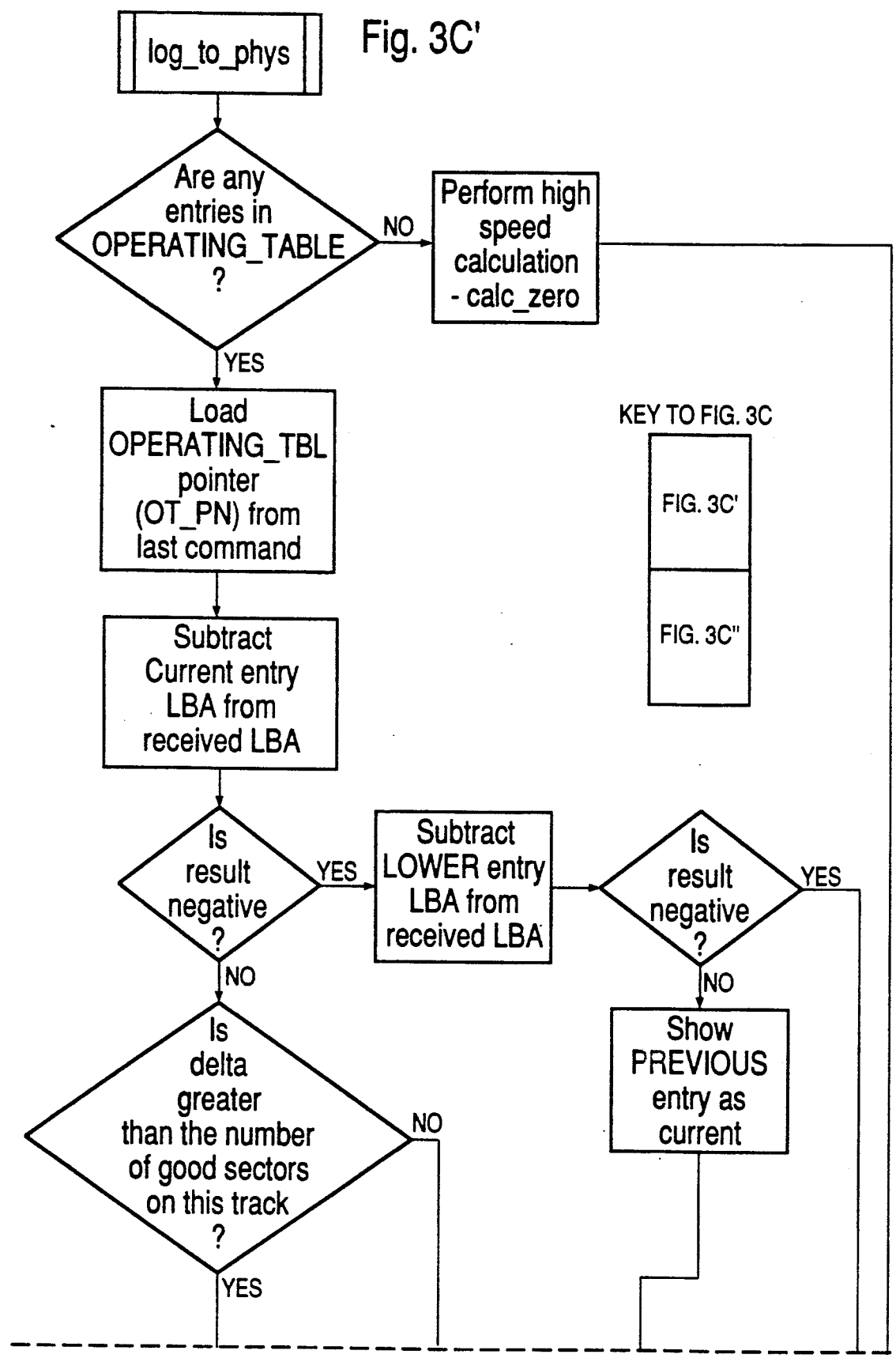
Figure 3C:
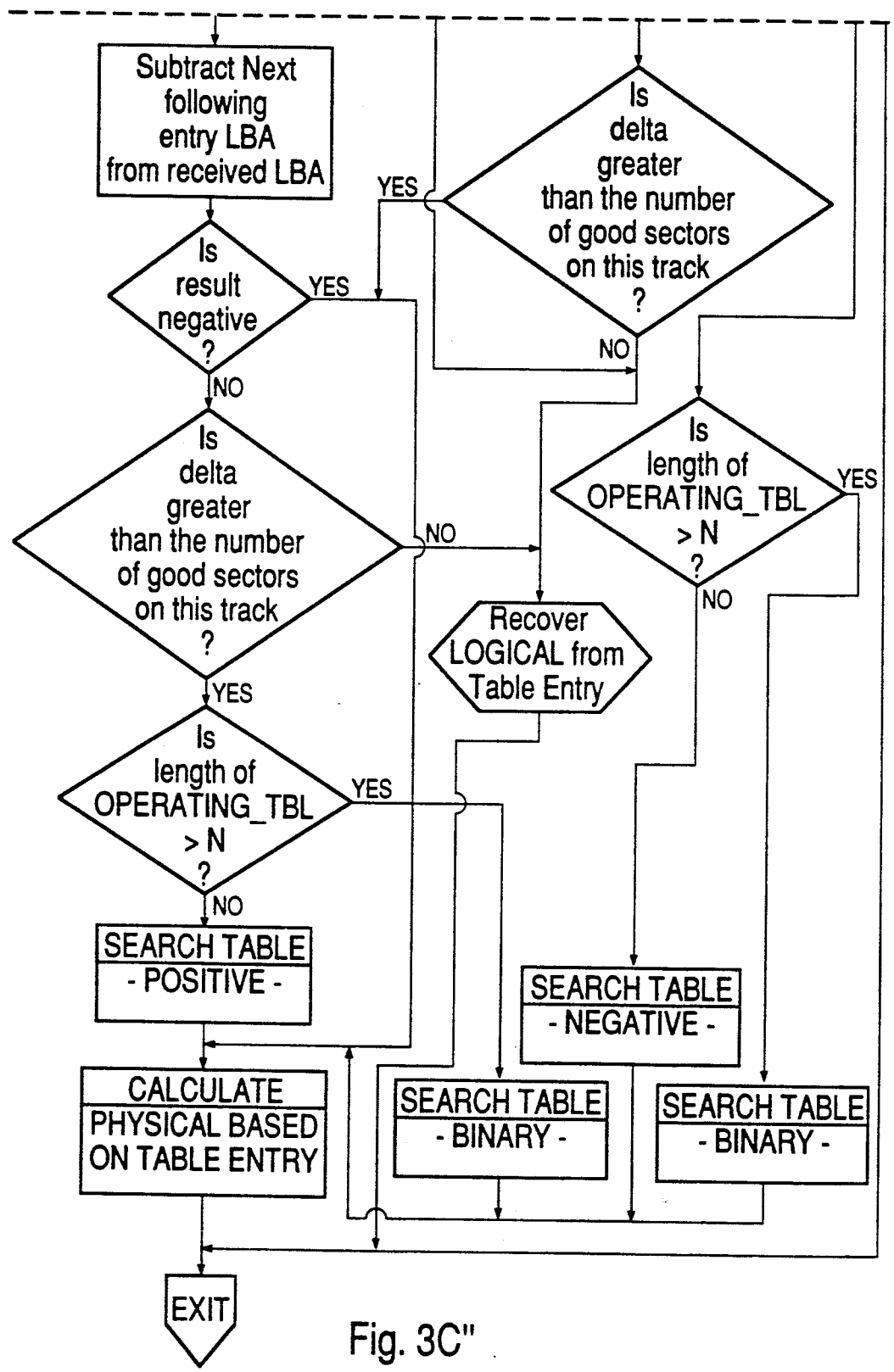

In the preferred embodiment of the invention, the method of the invention as shown in flow chart form in FIGS. 3A, 3B and 3C is implemented by means of a computer program written partly in assembly language and partly in "C" language. This program is conventionally installed in the ROM (Read Only Memory, not shown) of microprocessor 12 of FIG. 1, which preferably is a commercially available Motorola 8-bit microcontroller, part no. 68HC11.

The listing of the computer program used for defect management in the preferred embodiment is shown in Tables 4A to 4M, with appropriate explanatory comments included in the program listing.

Further embodiments of the invention include use of the invention in an optical disk drive, or in a floppy disk drive using defect management. Such a floppy disk drive would typically be a high capacity SCSI interface type floppy disk drive.

A portion of this disclosure contains material which is subject to copyright protection. The copyright owner has no objection to the facsimile reproduction of the patent disclosure, as it appears in the Patent and Trademark Office patent files or records, but otherwise reserves all copyright rights whatsoever.

The above description of the invention is illustrative, not limiting, and other embodiments will be obvious to one skilled in the art in light of the teachings of the invention.

```
*   FUNCTION NAME: binary_search
*
*   DESCRIPTION:  Find and return the base lba and Cyl/Hd/Log_sect for the
*                 closest operating table entry for a given lba using a
*                 "binary- search" type of algorithm
*
*   INPUT:    lba  (4 bytes)
*             operating_table
*             operating_len
*
*   RETURN:  X pointer to table entry of base address binary_search:
        LDX     operating_binary        * Point to half-way displacement
        LDAB    operating_len           * B = length of table
        CLRA                            * D = length of table
        ASLD                            *   = length of table * 2
        ASLD                            *   = length of table * 4
        STD     r2                      * .. and save displacement

*                                       * MAIN SEARCH LOOP
bin_loop:
        LDD     lba+1                   * Get first word of lba
        CPD     1,X                     * .. compare against table entry
        BCS     bin_ot_gt_lba           * .. if negative - branch
        BNE     bin_ot_lt_lba           * .. if not zero - branch
        LDAA    lba+3                   * Get next byte of lba
        CMPA    3,X                     * .. compare against table entry
        BCS     bin_ot_gt_lba           * .. if negative - branch
        BNE     bin_ot_lt_lba           * .. if not zero - branch
```

```
*
* | At this point lba = table base lba |
*
        STX     operating_pn
        LDAA    #1                      * Indicate no calculation
        BRA     bin_end                 * .. and exit
*
* | Table entry was larger than lba - back-up |
*
bin_ot_gt_lba:
        LDD     r2                      * Get displacement
        LSRD                            * .. divide by 2
        ANDB    #$F8                    * .. clear lower 2 bits
        CPD     #0                      * .. test if done
        BEQ     bin_adj                 * .. if result 0 then done
        STD     r2                      * .. and save it
        XGDX                            * Get pointer
        SUBD    r2                      * .. calculate new pointer
        XGDX                            * .. put back pointer
        BRA     bin_loop                * .. continue with search
*
* | Table entry was smaller than lba - go forward |
*
bin_ot_lt_lba:
        LDD     r2                      * Get displacement
        LSRD                            * .. divide by 2
        ANDB    #$F8                    * .. clear lower 2 bits
        CPD     #0                      * .. test if done
        BEQ     bin_done                * .. if result 0 then done
        STD     r2                      * .. and save it
        XGDX                            * Get pointer
        ADDD    r2                      * .. calculate new pointer
        XGDX                            * .. put back pointer
        BRA     bin_loop                * .. continue with search
*
* | decrement 1 entry |
*
bin_adj:
        XGDX                            * Get pointer
        SUBD    #8                      * .. back up by 1 element
        XGDX                            * .. put pointer back
*
* | Subtract table base from lba |
*
bin_done:
        STX     operating_pn
        CLRA                            * Set normal end
*
* | Common exit point |
*
bin_end:
        RTS                             * go back
        PAGE

*
* | FUNCTION NAME: pos_lin_search                                          |
* | DESCRIPTION:   Find and return the base pointer           for the      |
* |                closest operating table entry for a given lba using a   |
* |                "linear-search" type of algorithm. At input it is       |
* |                assumed that operating_pn already points to an entry    |
* |                from a previous operation or search. A search is then   |
* |                performed from this point forward to find the next      |
* |                closest entry.                                          |
* |------------------------------------------------------------------------|
* | INPUT:   lba  (4 bytes)                                                |
* |          operating_len   - length of operating table                   |
* |          operating_pn    - pointer to element from previous operation  |
* |------------------------------------------------------------------------|
* | RETURN: X pointer to table entry of base address                       |
*
pos_lin_search:
*                                       * MAIN SEARCH LOOP
pos_lin_loop:
        LDD     lba+1                   * Get first word of lba
        CPD     1,X                     * .. compare against table entry
```

```
            BCS     pos_ot_gt_lba           * .. if operating > lba - branch
            BNE     pos_ot_lt_lba           * .. if operating < lba - branch
            LDAA    lba+3                   * Get next byte of lba
            CMPA    3,X                     * .. compare against table entry
            BCS     pos_ot_gt_lba           * .. if operating > lba - branch
            BNE     pos_ot_lt_lba           * .. if operating < lba - branch
*
*    | At this point lba = table base lba                            |
*
            LDAA    #1                      * Set no calculate status
            BRA     pos_lin_done            * .. and exit
*
*    | Table entry was smaller than lba go forward by 1              |
*
pos_ot_lt_lba:
            XGDX                            * Get pointer
            ADDD    #8                      * .. increment by 1 element
            XGDX                            * .. put pointer back
            BRA     pos_lin_loop            * .. continue with search
*
*    | Table entry was larger than lba - exit                        |
*
pos_ot_gt_lba:
            XGDX                            * Get pointer
            SUBD    #8                      * .. back up by 1 element
            XGDX                            * .. put pointer back
            CLRA                            * Set do calculation
pos_lin_done:
            RTS                             * go back
            PAGE

*
*    | FUNCTION NAME: neg_lin_search                                 |
*    | DESCRIPTION:   Find and return the pointer          for the   |
*    |                closest operating table entry for a given lba using a |
*    |                "linear-search" type of algorithm. At input it is |
*    |                assumed that operating_pn already points to an entry |
*    |                from a previous operation or search. A search is then |
*    |                performed from this point backward to find the next |
*    |                closest entry.                                 |
*
*    | INPUT:  lba  (4 bytes)                                        |
*    |         operating_len   - length of operating table           |
*    |         X               - pointer to element from previous operation |
*
*    | RETURN: X pointer to table entry of base address              |
*    |         r0:r1:r2 = lba - base lba                             |
*
neg_lin_search:
*                                           * MAIN SEARCH LOOP
neg_lin_loop:
            LDD     lba+1                   * Get first word of lba
            CPD     1,X                     * .. compare against table entry
            BCS     neg_ot_gt_lba           * .. if operating > lba - branch
            BNE     neg_ot_lt_lba           * .. if operating < lba - branch
            LDAA    lba+3                   * Get next byte of lba
            CMPA    3,X                     * .. compare against table entry
            BCS     neg_ot_gt_lba           * .. if operating > lba - branch
            BNE     neg_ot_lt_lba           * .. if operating < lba - branch
*
*    | At this point lba = table base lba                            |
*
            LDAA    #1                      * Set no calculation status
            BRA     neg_lin_done            * .. and exit
*
*    | Table entry was larger than lba go backward by 1              |
*
neg_ot_gt_lba:
            XGDX                            * Get pointer
            SUBD    #8                      * .. increment by 1 element
            XGDX                            * .. put pointer back
            BRA     neg_lin_loop            * .. continue with search
```

```
*┌─────────────────────────────────────────────┐
*│  Table entry was larger than lba - stop    │
*└─────────────────────────────────────────────┘
neg_ot_lt_lba:
        CLRA                         * Set normal end status
neg_lin_done:
        RTS                          * go back
        PAGE
        LSTPAG-
```

```
*┌─────────────────────────────────────────────────────────────┐
*│  FUNCTION NAME: lba-displays                               │
*├─────────────────────────────────────────────────────────────┤
*│  DESCRIPTION: Translate a given lba into a target cylinder,│
*│               head, and logical sector.                    │
*├─────────────────────────────────────────────────────────────┤
*│  INPUT:  lba  (4 bytes)                                    │
*│          operating_table                                    │
*│          operating_pn                                       │
*│          operating_len                                      │
*├─────────────────────────────────────────────────────────────┤
*│  RETURN: cyl,calc_cyl                                      │
*│          head,calc_head                                     │
*│          calc_sec                                           │
*└─────────────────────────────────────────────────────────────┘
log_to_phys:

*┌─────────────────────────────────────────────┐
*│  See if any entries exist in the table     │
*└─────────────────────────────────────────────┘
        LDAB    operating_len    * Get length of table
        BNE     lba_check        * .. if some entries exist - branch
        JSR     calc_zero
        LDD     #0               * Set no errors
        JMP     ltp_end          * .. and exit

*┌─────────────────────────────────────────────────┐
*│  See if lba is in range for current table entry │
*└─────────────────────────────────────────────────┘
lba_check:
        LDX     operating_pn     * Recover last entry pointer
        LDD     lba+2            * Get lba from host
        SUBD    2,X              * .. test against lba from table
        STD     r0               * Save partial in r0
        LDAB    lba+1            * Get lba from host
        SBCB    1,X              * .. process msb
        BLO     lba_neg          * If recv'd lba < table.lba - branch
        BNE     check_table      * If delta lba very large - branch

*┌─────────────────────────────┐
*│  - lba > table.lba          │
*│  - (lba - table.lba) < 65536│
*├─────────────────────────────┤
*│  Calculate table.sect-(lba-table.lba) │
*└─────────────────────────────┘
        LDAA    r0               * Get delta
        BNE     check_table      * If msb set than too large - branch
        LDAB    7,X              * Get table.sector
        SUBD    r0               * .. subtract delta length
        BLE     check_table      * If not this entry - branch

*┌─────────────────────────────────┐
*│  - lba is on this table entry   │
*│  - B = transfer length          │
*├─────────────────────────────────┤
*│  Send parameters from table and exit │
*└─────────────────────────────────┘
        BRA     ltp_save         * Save parameters

*┌─────────────────────────────────┐
*│  lba is not on this table entry │
*├─────────────────────────────────┤
*│  Check the next table entry     │
*└─────────────────────────────────┘
check_table:
        LDD     lba+2            * Get lba from host
        SUBD    10,X             * .. test against lba from table
        STD     r0               * Save partial in r0
        LDAB    lba+1            * Get lba from host
        SBCB    9,X              * .. process msb
        BLO     ltp_quick        * If recv'd lba < table.lba - branch
        BNE     lba_poss         * If delta lba very large - branch
```

```
*┌─────────────────────────────────────┐
*│  - lba > table.lba           (next) │
*│  - (lba - table.lba   65586  (next) │
*└─────────────────────────────────────┘
*┌─────────────────────────────────────┐
*│ Calculate table.sect-(lba-table.lba)│
*└─────────────────────────────────────┘
        LDAA    r0              * Get delta
        BNE     lba_poss        * If msb set than too large - branch
        LDAB    15,X            * Get table.sector
        SUBD    r0              * .. subtract delta length
        BLE     lba_poss        * If not this entry - branch
*┌─────────────────────────────────────┐
*│  - lba is on the next table entry   │
*│  - B = transfer length              │
*└─────────────────────────────────────┘
*┌─────────────────────────────────────┐
*│ Send parameters from table and exit │
*└─────────────────────────────────────┘
        STAB    calc_sec        * Save transfer info
        LDD     12,X            * Get operating cylinder
        STD     calc_cyl        * .. to target area
        LDAA    14,X            * Get operating head
        STAA    calc_head       * .. into target area
        XGDX                    * Get table pointer
        ADDD    #8              * .. point to matching entry
        STD     operating_pn    * .. and save it
        LDD     #0              * Set no error
        JMP     ltp_end         * .. clean-up and exit
*┌─────────────────────────────────────┐
*│ lba is larger than the current      │
*│ .. operating table entry but        │
*│ .. smaller than the next entry      │
*└─────────────────────────────────────┘
*┌─────────────────────────────────────┐
*│ Go do calculation based on current  │
*└─────────────────────────────────────┘
ltp_quick:
        STX     operating_pn    * Save pointer for later
        JSR     calc_phys       * Go do translation
        LDD     #0              * Set no error
        JMP     ltp_end         * .. clean-up and exit
*┌─────────────────────────────────────┐
*│ lba < table.lba                     │
*└─────────────────────────────────────┘
*┌─────────────────────────────────────┐
*│ Check previous table entry          │
*└─────────────────────────────────────┘
lba_neg:
        XGDX                    * Put pointer into D
        SUBD    #8              * Point to previous entry
        XGDX                    * .. put pointer back into X
        LDD     lba+2           * Get lba from host
        SUBD    2,x             * .. test against lba from table
        STD     r0              * Save partial in r0
        LDAB    lba+1           * Get lba from host
        SBCB    1,x             * .. process msb
        BLO     lba_lt_op       * If recv'd lba < table.lba - branch
        BNE     ltp_quick       * If delta lba very large - branch
*┌─────────────────────────────────────┐
*│  - lba > table.lba                  │
*│  - (lba - table.lba) < 65536        │
*└─────────────────────────────────────┘
*┌─────────────────────────────────────┐
*│ Calculate table.sect-(lba-table.lba)│
*└─────────────────────────────────────┘
        LDAA    r0              * Get delta
        BNE     ltp_quick       * If msb set than too large - branch
        LDAB    7,X             * Get table.sector
        SUBD    r0              * .. subtract delta length
        BLE     ltp_quick       * If not this entry - branch
        BRA     ltp_save

*┌─────────────────────────────────────┐
*│  √ lba is on this table entry       │
*│  - B = transfer length              │
*└─────────────────────────────────────┘
*┌─────────────────────────────────────┐
*│ Send parameters from table and exit │
*└─────────────────────────────────────┘
ltp_qsave:
        LDAB    7,X             * Get sectors to xfer info
ltp_save:
        STX     operating_pn    * Save pointer
        STAB    calc_sec        * Save transfer info
```

```
        LDD        4,X              * Get operating cylinder
        STD        calc_cyl         * .. to target area
        LDAA       6,X              * Get operating head
        STAA       calc_head        * .. into target area
        LDD        #0               * Set no error
        JMP        ltp_end          * .. clean-up and exit
lba_poss:
        BRA        lba_pos
*
*| lba < current operating_table lba                |
*
*| Test length of operating_table                   |
*
lba_lt_op:
        LDAA       operating_len    * Get length of table
        CMPA       #TABLE_LEN       * .. test if real short
        BMI        search_neg       * .. if short - force negative linear serach
*
*| operating_table length > TABLE_LEN               |
*
*| Do binary search and calculation                 |
*
        JSR        binary_search    * Go find the correct entry
*
*| common post search entry routine                 |
*
common_calc:
        STX        operating_pn     * .. save pointer
        TSTA                        * See if calculation necessary
        BNE        ltp_qsave        * Set direct if flag set
        LDD        lba+2            * Get lba from host
        SUBD       2,x              * .. test against lba from table
        STD        r0               * Save partial in r0
        LDAB       lba+1            * Get lba from host
        SBCB       1,x              * .. process msb
        BLO        lba_neg          * If recv'd lba < table.lba - branch
        BNE        calc_more        * If delta lba very large - branch
*
*| - lba > table.lba                                |
*| - (lba - table.lba) < 65536                      |
*
*| Calculate table.sect-(lba-table.lba)             |
*
        LDAA       r0               * Get delta
        BNE        calc_more        * If msb set than too large - branch
        LDAB       7,X              * Get table.sector
        SUBD       r0               * .. subtract delta length
        BLE        calc_more        * If not this entry - branch
*
*| - lba is on this table.entry                     |
*| - B = transfer length                            |
*
*| Send parameters from table and exit              |
*
        BRA        ltp_save         * Save parameters
calc_more:
        JSR        calc_phys        * Do calculation
        LDD        #0               * Clear errors
        BRA        ltp_end          * .. and exit
*
*| operating_table length < TABLE_LEN               |
*
*| Do negative linear search and calc               |
*
search_neg:
        JSR        neg_lin_search   * Go find the correct entry
        BRA        common_calc      * .. do rest of calculations
*
*| lba > next operating_table lba                   |
*
*| Test length of operating_table                   |
*
lba_pos:
        LDAA       operating_len    * Get length of table
        CMPA       #TABLE_LEN       * .. test if real short
        BMI        search_pos       * .. if short - force positive linear serach
```

```
*   ┌─────────────────────────────────────────────┐
*   │ operating_table length > TABLE_LEN          │
*   ├─────────────────────────────────────────────┤
*   │ Do binary search and calculation            │
*   └─────────────────────────────────────────────┘
        JSR     binary_search   * Go find the correct entry
        BRA     common_calc     * .. do rest of calculations
*   ┌─────────────────────────────────────────────┐
*   │ operating_table length < TABLE_LEN          │
*   ├─────────────────────────────────────────────┤
*   │ Do positive linear search and calc          │
*   └─────────────────────────────────────────────┘
search_pos:
        JSR     pos_lin_search  * Go find the correct entry
        BRA     common_calc     * .. do rest of calculations
ltp_end:
        LDD     #0
        RTS

*   ┌─────────────────────────────────────────────────────────────────┐
*   │ FUNCTION NAME: calc_next                                        │
*   ├─────────────────────────────────────────────────────────────────┤
*   │ DESCRIPTION: Calculate the physical block address from the elem │
*   │              the operating_table pointed to by operating_pn and calc_lba │
*   │              and return the head+cylinder for the next seek as well as │
*   │              the number of sectors that are usable on the selected track. │
*   │                                                                 │
*   │              This routine performs the function indicated by searching │
*   │              the operating table  - given calc_lba  - for a match to the │
*   │              lba in each table entry. If no match is found to the entry │
*   │              "currently" point to by operating_pn than it will be │
*   │              assumed that the given calc_lba is a track full of "usable" │
*   │              sectors (no defects).                              │
*   ├─────────────────────────────────────────────────────────────────┤
*   │ INPUT: calc_lba (4 bytes)                                       │
*   ├─────────────────────────────────────────────────────────────────┤
*   │ RETURN: D = 0                                                   │
*   │         --calc_cyl                                              │
*   │           calc_head                                             │
*   │           calc_sec                                              │
*   ├─────────────────────────────────────────────────────────────────┤
*   │ Notes:                                                          │
*   │   1. It is assumed that the contents of calc_head, calc_cyl are not │
*   │      modified by any other routine                              │
*   │   2. It is assumed that calc_lba points to a sector that is the lowest │
*   │      number on a given track                                    │
*   │   3. It is assumed that this routine will be called by the R/W  │
*   │      routines once per seek                                     │
*   └─────────────────────────────────────────────────────────────────┘
calc_next:
        TST     operating_len   * Check for length of table
        BEQ     bump_pba        * .. if there are no entries - branch
        LDX     operating_pn    * Point to next entry
        LDD     calc_lba+2      * Check LBA's - get r/w version ..
        CPD     10,X            * .. and compare to table - lsw
        BNE     bump_pba        * .. if not same - branch
        LDAB    calc_lba+1      * .. now check msb - of r/w version
        CMPB    9,X             * .. against table version - msb
        BNE     bump_pba        * .. if not same - branch
*-----------------------------------------------------------------
* We have found a match between the lba indicated by the R/W
* .. routines and the current table entry
* - recover the values stored in the table
* - bump the pointer to the operating table
*-----------------------------------------------------------------
        LDD     12,X            * Recover cylinder
        STD     calc_cyl        * .. put into return area
        LDAB    14,X            * Recover head
        STAB    calc_head       * .. put into return area
        LDAB    15,X            * Get sectors to transfer
        STAB    calc_sec        * .. put into return area
        LDD     operating_pn    * Get pointer to operating table
        ADDD    #8              * .. point to next entry
```

```
        STD     operating_pn            * .. and save it for later
        BRA     calc_next_end           * Terminate
*------------------------------------------------------
* We found no matches or there were no entries in the
* .. operating table so just increment pba
*------------------------------------------------------ bump_pba:
        INC     calc_head               * Bump head into
        LDAB    calc_head               * .. and recover it
        CMPB    #TRACKS_PER_CYL         * .. see if we need to process carry
        BNE     head_no_carry           * .. if no carry - branch
        LDX     calc_cyl                * Get cylinder info
        INX                             * .. process carry
        STX     calc_cyl                * .. re-save it
        CLR     calc_head               * Clear head info
head_no_carry:
        LDAB    #SECTORS_PER_TRACK      * Indicate length
        STAB    calc_sec                * .. and save it
calc_next_end:
        LDD     #0                      * Indicate no errors
        RTS                             * Exit
```

```
* FUNCTION NAME: calc_phy_
*
* DESCRIPTION: Calculate the physical block address from the element of
*              the operating_table pointed to by operating_pn and the lba
*
* INPUT:  lba         ( 4 bytes )
*         operating_table
*         operating_pn
*
* RETURN: D =  undefined
*         cyl
*         head
*         calc_sec
*
* Notes: The method used to calculate the parameters is shown as follows:
*   1. delta_lba = lba - (operating_table[operating_pn].lba +
*                          operating_table[operating_pn].sector )
*   2. cyl =  (delta_lba / (sectors/cylinder)) +
*             operating_table[operating_pn].cylinder
*   3. head = ((remainder from (2))/(sectors/track)) +
*             operating_table[operating_pn].head
*   4. calc_sector = sectors/track - remainder from (3)
```

```
calc_phys:

* Calculate delta_lba
*
        LDX     operating_pn            * Point to operating element
        LDAB    7,X                     * .. get the table's sector count
        CLRA                            * .. clear upper byte
        ADDD    2,X                     * .. add the table's lba - lsw
        STD     r1                      * .. save partial into r1r2
        LDAB    #0                      * Get B=0
        ADCB    1,X                     * .. process carry
        STAB    r0                      * Save so that r0r1r2 = next lba LDD     lba+2                   * Get lba lsw
        SUBD    r1                      * D = calc_lba - operating_lba (2 bytes
        STD     r1                      * .. save result
        LDAA    lba+1                   * Get msb of lba
        SBCA    r0                      * Subtract final value

* Calculate delta_cylinder
*
        LDAB    r1                      * D = delta_lba - msw
        LDX     #SECTORS_PER_CYL        *
        IDIV                            * X = D/X  D=remainder
        STX     r3                      * Save quotient
        TBA                             * Adjust remainder
        LDAB    r2                      * Recover lsb
        LDX     #SECTORS_PER_CYL        *
                                        * X = delta_cylinder B = delta_sector
```

```
        IDIV
        STAB    r5                          * X = delta_cylinder B = delta_sector
        XGDX                                * Save remainder
        ADDA    r4                          * B = delta_cylinder
        LDX     operating_pn                * Add in previous division
        ADDD    4,X                         * Point back to table
        STD     calc_cyl                    * Add base cylinder ID
                                            * .. also into sub area

* Calculate calc_head
*
        LDAB    r5                          * D = delta_sectors
        CLRA                                * D = delta_sectors
        LDX     #SECTORS_PER_TRACK          *
        IDIV                                * X = delta_head D = sector
        LDAA    #SECTORS_PER_TRACK          * Calculate sectors to go
        SBA                                 * .. do calculation
        STAA    calc_sec                    * .. and save
        XGDX                                * D = delta_head
        LDX     operating_pn                * Point back to table
        ADDB    6,X                         * B = target head
        INCB                                * .. adjust for algorithm
        CMPB    #TRACKS_PER_CYL-1           * .. test for head overflow
        BLS     no_head_adjust              * .. if head in range - branch
        LDX     calc_cyl                    * .. bump cylinder
        INX                                 *
        STX     calc_cyl                    *
        SUBB    #TRACKS_PER_CYL             * Adjust head number
no_head_adjust:
        STAB    calc_head                   * .. also into sub area
        RTS
```

---

```
* FUNCTION NAME: calc_zero
*
* DESCRIPTION: Calculate the physical block address from the lba only
*
* INPUT: lba (4 bytes)
*
* RETURN: D = undefined
*         cyl
*         head
*         calc_sec
*
* Notes: The method used to calculate the parameters is shown as follows:
*   1. cyl = lba / (sectors/cylinder)
*   2. head = (remainder from (1))/(sectors/track)
*   3. calc_sec = sectors/track - remainder from 2
``` calc_zero:
                                                                            Cycles
                                                                            ------

```
* Divide LBA by 2
*
        LDD     lba+1                       * D = lba - msw              5
        LSRD                                * Divide LBA by two          3
        STD     r5                          * .. and save it             5
        LDAB    lba+3                       *                            4
        RORB                                *                            2
        STAB    r7                          *                            4
        LDD     r5                          *                            5
        LDX     #SECTORS_PER_CYL/2          *                            3
        IDIV                                * X = D/X  D=remainder      41
        STX     r3                          * Save quotient              5
        TBA                                 * Adjust remainder           2
        LDAB    r7                          * Recover lba-lsb            4
        LDX     #SECTORS_PER_CYL/2          *                            3
        IDIV                                * X = cyl B = delta_sec     41
        XGDX                                * B = delta_cylinder         3
        ADDA    r4                          * Add in previous division   4
        STD     calc_cyl                    * .. also into sub area      5

* Calculate calc_head
*
        XGDX                                * D = delta_sectors          3
        LDX     #SECTORS_PER_TRACK/2        *                            3
```

```
    IDIV
    XGDX
    STAB    calc_head
    XGDX
    LDAA    lba+3
    RORA
    ROLB
    LDAA    #SECTORS_PER_TRACK
    SBA
    STAA    calc_sec
    LDD     calc_cyl
    ADDD    #5
    STD     calc_cyl

RTS
*
*
*
```

```
* X = delta_hd  D = sector      41
* B = head                       3
* .. also into sub area           4
* B = sector                      3
* Re-construct sector info        2
* .. get lsb                      2
* .. and adjust                   2
* Calculate sectors to go         2
* .. do calculation               2
* .. and save                     4
* Adjust cylinder for "DMZ"       5
*                                 4
*                                 5

5
                                ------
                Total Cycles:
                Total usecs:
```

I claim:

1. A method of accessing data on a recording medium having a plurality of tracks, each track including a plurality of recording areas, comprising the steps of:
creating a list of the tracks;
determining which tracks contain defects;
determining the number of recording areas of each track which are free of defects;
entering the number of recording areas free of defects for each track on the list of the tracks; and
accessing data on those recording areas which are free of defects by reference to the list of the tracks and without reference to a list of any particular recording areas which contain defects.

2. The method of claim 1, further comprising the step of eliminating from the list of the tracks those tracks which are free of defects.

3. The method of claim 1, wherein the recording areas are sectors.

4. The method of claim 1, further comprising the step of storing the list of the tracks on the recording medium.

5. The method of claim 4, wherein the nonvolatile memory is in the recording medium.

6. The method of claim 1, wherein the step of creating the list of the tracks further comprises the step of listing the head number and cylinder number of each track on the list.

7. The method of claim 6, wherein the step of creating the list of the tracks further comprises the step of listing a logical address for the first area of each track on the list of the tracks.

8. The method of claim 7, wherein the logical address is in SCSI (Small Computer Systems Interface) format.

9. The method of claim 1, wherein, the recording medium is a magnetic disk.

10. The method of claim 1, wherein the recording medium is an optically recorded disk.

11. The method of claim 9, wherein the magnetic disk is a hard disk.

12. The method of claim 9, wherein the magnetic disk is a floppy disk.

13. The method of claim 4, further comprising the step of transferring the list of the tracks from the recording medium to a random access memory at a predetermined time.

14. The method of claim 1, wherein the step of accessing data comprises the step of writing data to the recording areas.

15. The method of claim 1, wherein the step of accessing data comprises the step of reading data from the recording areas.

16. The method of claim 1, wherein the step of accessing data comprises the step of seeking from a first track to a second track.

17. The method of claim 1 wherein the step of accessing data comprises the steps of:
determining which particular track on the list of the tracks is closest to a logical address of the data to be accessed;
calculating a physical address of the data to be accessed from the number of recording areas free of defects in the particular track; and
accessing the physical address so calculated.

18. The method of claim 1, further comprising the step, after the step of determining which tracks contain defects, of marking the recording areas in which the defects occur.

19. A data recording system comprising:
a recording medium having a plurality of tracks, each track including a plurality of recording areas;
means for creating a list of the tracks;
means for determining which tracks contain defects;
means for determining the number of recording areas of each track that are free of defects;
means for entering the number of recording areas free of defects in each track on the list of the tracks, and
means for accessing the recording areas of each track by reference to the list of the tracks, and without reference to a list of any particular recording areas which contain defects.

20. A method of accessing data on a recording medium having a plurality of tracks, each track including a plurality of sequentially arranged recording areas, comprising the steps of:
determining which recording areas include defects;
determining the number of recording areas of each track which are free of defects;
marking each recording area which includes a defect;
accessing those recording areas that do not include defects by:
calculating the location of a particular recording area on a particular track from the determined number of recording areas of the particular track which are free of defects, without reference during the step of accessing to which particular recording areas include defects; accessing the calculated location; and
only if the calculated location is a marked recording area, then accessing the subsequent recording area in the sequential arrangement.

* * * * *